Sept. 16, 1969        L. HUGI        3,467,760
ELECTRICAL DEVICE WITH A FLUID INSULATING MEDIUM
Filed Aug. 24, 1966
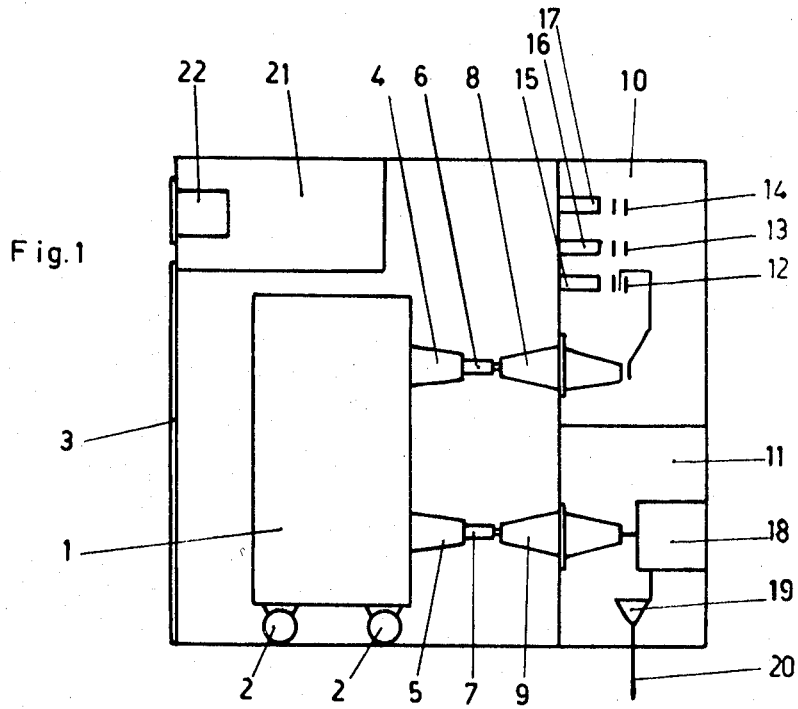
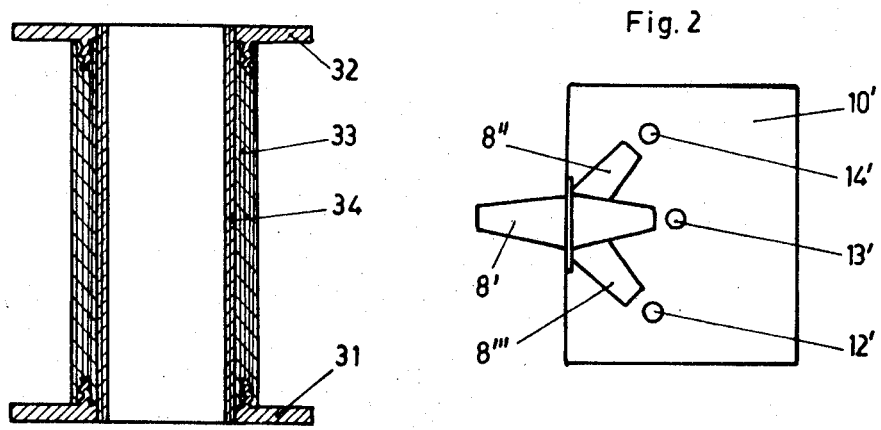
Inventor
LITTY HUGI United States Patent Office 3,467,760
Patented Sept. 16, 1969

3,467,760
ELECTRICAL DEVICE WITH A FLUID
INSULATING MEDIUM
Litty Hugi, Wettingen, Switzerland, assignor to Aktiengesellschaft Brown, Boveri & Cie, Baden, Switzerland
Filed Aug. 24, 1966, Ser. No. 574,769
Claims priority, application Switzerland, Aug. 26, 1965,
12,021/65
Int. Cl. H05k 5/02
U.S. Cl. 174—17                    6 Claims

ABSTRACT OF THE DISCLOSURE

Insulating parts of electrical devices that must operate in contact with a fluorine compound are made of cast epoxy resins. In order to avoid decomposition by arcing the fillers for the resins exclude silicon and boron and their compounds.

---

This invention relates to electrical equipment and is concerned with improvements in electrical devices which make use of a fluid insulating material consisting of or comprising a fluorine-containing compound such for example as sulphur hexafluoride. The term "electrical devices" is meant to refer to switches, circuit breakers, transformers, transducers and similar apparatus, the operation of which usually or occasionally gives rise to arcing, sparking or glow discharges.

It heretofore had been experienced that electrical devices (of the sorts alluded to above) using fluid fluorine compound-containing insulation material, after altogether too brief periods of operation, suffered a substantial decrease in the surface resistance of the insulating parts. It was known that arcing, sparking and glow discharges lead to decomposition of fluorine-containing insulating materials; also, that such decomposition products are very corrosive, and that they actively attack constructional parts disposed in the aforesaid electrical devices.

Until now, a misconception with respect to the reasons for the aforesaid resistance decrease had been generally accepted. It had been assumed that the decline in surface resistance occurs actually in that more or less conductive substances condense on the surface of solid insulating parts and then gradually form a stratified coating originating from reaction of the decomposition products of the fluorine-containing gaseous or liquid insulating material with specific, particularly metallic, construction parts. It had not been ascertained that components of the solid insulators themselves as used hitherto have decidedly participated in the occurrence of such "stratified coating" reducing the surface resistance. This is best proved by the fact that up to now the solid insulating parts have been produced of porcelain, or of epoxy resin filled with powdered quartz, or of polyester resin reinforced with glass fibers where—apart from the cost—aspects of the fabrication and the mechanical and electrical properties were decisive for the selection of powdered quartz or glass fibers as components of the composition.

The present invention consists in a practical application of principles now to be stated.

When decomposition products of $SF_6$ encounter water (even only traces of moisture), and hydrolysis reaction will immediately take place according to the formula $$SF_4 + 2H_2O \rightarrow H_2F_2 + SO_2 \qquad (1)$$

The reaction takes place in a similar manner as with $SF_4$, also with other fluorides and oxyfluorides of sulphur, such as $SF_2$, $SOF_2$ and $SOF_4$. If the reaction occurs at the surface of an insulator, the acids formed thereby (hydrofluoric acid and sulphurous acid) have the effect of reducing the surface resistivity. It has been found, however, that the aforesaid reduction in resistivity is of short duration only, the reason being that the two reaction products are very volatile and will evaporate very quickly from the surface.

A similarily rapid restoration of the surface resistivity would therefore be expected in case of all reactions where volatile reaction products are generated and this has been assumed heretofore in case of a consequent reaction according to Formula 1, at a $SiO_2$- or silicate-containing insulator, for example at an epoxy resin insulator containing silica filler or at a porcelain insulator:

$$SiO_2 + 2H_2F_2 \rightleftharpoons SiF_4 + 2H_2O \qquad (2)$$

The $SiF_4$ formed thereby is a gas with a sublimation temperature of $-95.1°$ C., so that in view of the evaporation of the $SiF_4$ and the shift of the equilibrium in Equation 2 toward the right a rapid reduction in the surface conductivity should be expected. Likewise, by assuming the formation of $H_2SiF_6$ according to the equation.

$$H_2F_2 + SiF_4 \rightleftharpoons H_2SiF_6$$

it was to be expected, on the basis of the data found in the literature, that this phenomenon would not exert a lasting influence on the surface resistivity because $H_2SiF_6$ in the form of a free acid is unstable and acts like a mixture of $H_2F_2$ with $SiF_4$, and is likewise to be considered, so to speak, as "volatile." For the above given reasons it heretofore was assumed that in spite of the reaction with $SiO_2$ the surface conductivity would become lower just as rapidly as in the absence of $SiO_2$.

Contrary to the generally accepted theories, I have discovered that there occurs, under the influence of hydrolyzable sulphur fluorides, in $SiO_2$-filled epoxy resins or porcelain, in the presence of moisture, a reduction in surface resistivity which will last for a long period of time which was not understood and interpreted correctly heretofore. Thus, I found that in the aforesaid situation a surface coating of high deliquescence is formed and that—contrary to the presently held theory—the actions mentioned above are caused by the appearance of the ion $SiF_6''$ within the coating. nI switching devices—where, in addition to the gaseous decomposition products of $CF_6$, there are formed also metal fluorides in powder form—there is generated an additional stabilization of the $SiF_6''$ by the formation of metalsilicofluorides $Me_x(SiF_6)_y$. These metalsilicofluorides which more or less possess hygroscopic characteristics and which are very often easily soluble, consequently contribute to a further increase in the conductivity of the moist coatings so formed.

The inventor has ascertained that the surface resistance of a solid insulator does not show any perceptible diminution when no silicon compounds are contained therein, and it has been found that the aforesaid otherwise appearing, more or less conductive, stratified layers occurred mainly in that the decomposition products, under interaction of water (always present in traces) form together with silicates or other silicon-containing compounds contained in the solid insulator the reaction product silicon hydrofluoric acid which, being a strong acid, possesses a high conductivity. The silicon hydrofluoric acid can, in its turn, react with the metal salts which emanate from the effect of the decomposition products on metallic construction parts and from metal-silicon-fluorides which because of their hygroscopic character and easy solubility can—if moisture be present—likewise cause a disadvantageous diminution of the surface resistance.

I have ascertained further that boron and its compounds behave in an analogous way and lead to similar results as those of the silicon and thus should not be contained in the solid insulator according to the invention. It cannot be excluded that still other substances of similar behavior and with similar results might be found; however, it can be said that the elimination of silicon or silicon compounds should mostly be considered because of the present, enlarged application in the form of porcelain or fillers.

According to the invention it is advantageous when the casting resin mix contains an epoxy resin on the basis of bisphenol A-epichlorohydrine with an epoxy equivalent weight between 175 and 1500, as well as at least, a cycloaliphatic dicarboxylic acid anhydride or an amine as hardener, and as filler, at least one of the following substances: water-insoluble solid fluorides, carbonates, sulfates and oxides with the exception of silicon compound and boron compounds. Experience has demonstrated that the following substances are particularly advantageous as fillers, either alone or together with other substances: aluminum oxide $Al_2O_3$, particularly in the form of fused corundum; activated alumina and calcium fluoride. According to the invention these filler substances preferably should be in a splintery crystalline form and to have a grain size of 50 microns at a maximum.

According to the invention it is not unconditionally necessary to use a filler; the electrical device is and remains safe in operation to an adequate extent when the solid insulating part consists of the unfilled casting resin. However, the fillers according to the invention improve the resistance and also the mechanical properties, and they reduce the costs so that their application is advantageous.

Casting resin mixes as above described supply solid insulating parts which have very good properties. Considering their resistance toward the decomposition products of the gaseous or liquid fluorine-containing materials, they secure a perfect and permanent operating safety of the electrical device.

The selection of the hardener influences the gelling time of the casting resin mix in a known way. It was found that the gelling time with corundum as filler is shorter than with quartz filling when the corundum—apart from the alpha-phase ($Al_2O_3$)—shows a relatively high proportion of the beta-phase ($Na_2O.11Al_2O_3$). If a specific hardener effects an undesirably short gelling time, this can be modified by choosing a corundum with a correspondingly slight content of the beta-phase.

The dielectric properties of the finished casting are very good, and very significantly better than those made with powdered quartz as filler. In this connection it has been found that it is not necessary to apply very pure and thus correspondingly expensive products as fillers for this purpose. Thereby it is possible to attain an economic competitiveness with powdered quartz fillers. This is not affected by the requirement for absence of $SiO_2$, because this impurity is practically not involved in many inexpensive, commercial products. A perceptible pollution by $SiO_2$ would, as it has been conclusively demonstrated, diminish the surface resistance of the casting toward fluorine-containing decomposition products or increase its tendency for diminishing the surface resistance.

A further development of the inventive concept was achieved through the discovery that the mechanical properties of the casting with unchanged selection of resin, hardener and viscosity of the mix depend essentially only on the grain shape and grain size of the filler. The described splintery grain shape—the edges should be as sharp as possible—and the grain size not to exceed 50 microns at a maximum can readily be adhered to in practice, and thereby there are secured for the castings better mechanical properties than those which can be obtained with the standard, conventional powdered quartz. In connection with the subject of grain size it is to be mentioned that the proportion of extremely small grains should not be large, because otherwise a certain coagulation risk would exist: conversely, the proportion of grains larger than 40 microns also should be slight, since otherwise sedimentation effects could disturb the processing and adversely affect the properties of the casting. In other words, while the particle size range may be extensive, the major part of the particles should have a 10–40 microns range.

The substances above mentioned as examples of particularly advantageous fillers always impart typical properties to the casting containing them. If the casting should possess a maximum resistance toward fluorine-containing decomposition products or toward diminution of the surface resistance, aluminum oxide, or, even more preferable calcium fluoride, should be used as filler component. Simultaneously, these substances effect a good resistance to weather and to the electric arc. Aluminum oxide trihydrate is still better in its resistance to weather and to the electric arc, but it shows a slightly diminished resistance against the effect of fluorine-containing decomposition products. Activated alumina shows a behavior which is intermediate the above; however, it supplies castings having somewhat reduced mechanical strength, which circumstance appears to be conjugated here with non-optimum grain shape.

If the solid insulator is exposed to various stresses at different points, for example, outside by decomposition substances, and additionally by electric arc—or, in another case, exposed to fluorine-containing decomposition and additionally to the weather—it sometimes is expedient that the casting resin mix comprise components of different compositions, particularly as regards the fillers. Of course, incorporating a plurality of different filler substances is connected with increased costs, and is expedient only when the technical conditions require the maximum utilization of diverse properties.

According to another embodiment of the inventive concept, a still further increased surface resistance of the solid insulating part can be achieved if the filler selected for effecting increased surface resistance and added to the casting resin mix is contained in greater concentration in proximity to the surface of the cast insulating part than in the interior of the casing. A greater concentration of filler particles close to the surface of the casting can be achieved by rotating the casting mold combined the resinous casting mix for the cast solid insulating part prior to the hardening of the mix. Inasmuch as the resistance improvement depends not only on the nature but also on the concentration of the filler, a greater resistance is in this way achieved on the surface exposed to the chemical attack than under uniform distribution of filler without, on the other hand, increasing the relative amount of the filler and hence the viscosity of the mix during casting. Of course, at least roughly rotationally symmetrical shape of casting come into consideration in this connection.

An additional refinement based on this inventive concept provides that one filler effecting particularly an increased resistance and added to the casting resin mix in the proximity of the surface of the solid insulating part is contained to a greater extent, i.e., in stronger concentration, than at least one other filler added to the casting resin mix for effecting particularly an increased mechanical strength of the solid insulator. These concentration differences can be caused by rotation of the casting resin mold with the solid insulating part cast therein prior to its hardening, as well as in that the filler which affects particularly an increased resistance has a greater specific weight and larger grain size than the filler which particularly an increased mechanical strength. Thus it may be preferred that a filler which protects a surface exposed to chemical attack and which effects particularly an increased surface resistance is present in larger concentration in the outer layers of the casting while the other filler that effects particularly good mechanical properties is left as it is inside of the casting and in essentially uniform distribution.

One recipe for a casting resin mix in the production of solid insulators according to the invention is described in the following example.

100 parts by weight of component A,
20–70 parts by weight of compound B, and
20–80 percent of component C.

In the above, component A means an epoxy resin on the basis of bisphenol A-epichlorohydrin with an epoxy equivalent weight between 350 and 500; component B means an eutectic mix of cyloaliphatic dicarboxylic acid anhydride; and component C means fused corundum, splintery and with grain size 1–30 microns.

As usual, in recipes for plastics compositions, "percent" of component C means percent by weight of C related to—in this case—the total quantity A plus B.

In known manner these components are mixed together and cast in a suitable mold. The hardening conditions correspond to the specifications of the producer. The dielectric and mechanical properties of the castings are, at least, as good as the most advantageous ones that can be achieved with powdered quartz filling; the resistance to weathering and electric arc influence is essentially better; the price—depending on the corundum quality—is either no higher or at most only a little higher than mere powdered quartz fillers used. Above all, the resulting casting is resistant to the influence of fluorine-containing decomposition products, particularly, regarding reduction of the surface resistance.

The invention will now be further described with reference to the accompanying drawing, in which FIG. 1 is a schematic representation of a switching device;

FIG. 2 illustrates a variant of the structure shown in FIG. 1; and

FIG. 3 is a vertical sectional view of an extinction chamber insulator of a sulphur hexafluoride-filled power switch.

In FIG. 1, 1 is a switch, for example filled with $SF_6$, which can roll out on its wheels 2 through a door 3 and whose projecting parts 4 and 5 of its bushing insulators carry plug linkages 6 and 7, and whose counterparts are fastened on bushing insulators 8, 9 to chambers 10, 11 filled with $SF_6$. The one phase 12 of a three-phase collecting bar system is attached to the internal part of the bushing insulator 8, the other phases 13, 14 thereof being connected to switches (not shown) to be visualized as located in front of or behind switch 1. The collecting bar system 12, 13, 14 is carried by insulators 15, 16, 17. To the internal part of the insulator 9 there is attached a current transformer 18, which transformer is connected to cable 20 through a cable terminal 19. A space 21 contains—apart from the conventional instruments leads and control lines—specific measuring devices 22 whise scale is visible exteriorly above the door 3. In general, air at atmospheric pressure is adequate for the room 21. The solid insulating parts of the device, namely, the parts 4, 5, 8, 9, 15, 16, 17 and 18 in the form of resinous cast transformers embody at least one of the characteristics of the invention, like the bushing insulators 8', 8'', 8''' in FIG. 2.

FIG. 2 represents a variant of FIG. 1. In the space 10' filled with $SF_6$ collecting bars 12', 13', 14' are fastened directly to insulators 8', 8'', 8''', so that special insulators carrying the collecting bars are eliminated. Insulator 8' corresponds essentially to the construction 8, while 8'' is downwardly angled and 8''' is angled similarly to the latter although compared therewith it is turned by 180 degrees.

FIG. 3 represents in section, an extinction chamber insulator of a $SF_6$-filled power switch, for example, of the switch 1 diagrammatically indicated in FIG. 1. An insulating box 33 with characteristics of the invention is cast between metallic flanges 31, 32, for example, the casting mix containing epoxy resin and splintery corundum of 1–30 microns grain size as filler. Another insulating box 34 can be cast inside box 33, the inner box 34 embodying other features of the invention, for example, being a resinous casting containing aluminum oxide-trihydrate as filler.

With regard to concentrating filler particles adjacent the surface of a resinous casting (resin-hardener-accelerator—finely divided filler free from silicon and boron), it should b noted that realization of this concept is confined to cylindrical or substantially cylindrical molds. The resin is introduced while the mold is rotating, and the rotation is continued (depending on the mixture and the curing temperature) until the curing is completed. The concentration of the filling material at the surface of the molded article depends on the viscosity of the fluid mix used, and also on the initial filler composition as well as on the speed employed.

The examples given below will illustrate this point:

(1) A mixture consisting of 100 parts by weight of a cycloaliphatic epoxy resin, 100 parts by weight of anhydride hardener, 12 parts of accelerator and 400 parts by weight of finely divided $Al_2O_3$ were centrifugated at 400 revolutions per minute for two hours at a temperature of 130° C. At a total wall thickness of 4 mm. of the cylindrical casting, the tube contained inside a substantially pure resin layer of 1 mm. thickness. Therefore, the average $Al_2O_3$-content of the 3 mm.-thick outer layer had been increased from 67 to 77 percent by weight of $Al_2O_3$.

(2) A mixture consisting of 100 parts by weight of resin, 100 parts by weight of hardener, 12 parts by weight of accelerator and 600 parts by weight of $Al_2O_3$ were centrifuged under the same conditions as given in Example 1. After completion of the test a visual inspection failed to show a division between pure resin and packed resin.

(3) A mixture as given in Example 2 (resin to filler ratio 1:3) was centrifuged at 600 revolutions per minute, all other conditions being identical with the Examples 1 and 2. At the end of the test the thickness of the non-packed resin layer was 1 mm., with a total wall thickness of 5 mm. Therefore, the average content of solid filler particles in the outer layer had been increased from 75 to 83 percent by weight of the $Al_2O_3$.

While epoxy resins derived from bisphenol-A-epichlorhydrine and cycloaliphatic epoxy resins—e.g., of which latter group diepoxides of cyloaliphatic esters are illustrative—have been mentioned above as being operable in this relation, it is to be understood that the invention does not reside in the particular resin used but rather the invention can make use of any known resin of the general characteristics of the above referred to epoxy resins. Similarly, hardening agents already known to be operable in the epoxy resin art may be employed. In general, it may be noted that preferable reagents are such as cycloaliphatic or other dicarboxylic acid anhydrides as for example methylhexahydrophthalic acid anhydride. The reader will appreciate also, that accelerators usual in the epoxy resin art are to be employed in the resinous casting mix of this invention.

I claim:

1. In an electrical device comprising a member to be connected in voltage supply, a solid insulating member, a container-shaped member, and a fluid insulating medium contained within said container-shaped member said fluid insulating medium comprising a fluorine compound having insulating properties and known to be decomposed by the influence of an electric arc, the improvement which consists in providing as said solid insulating member a resinous cast body the surface of which is in direct contact with said medium, said cast body being substantially free from a compound which reacts with a decomposition product of said fluid insulating medium to form a reaction product substantially reducing the surface resistance of the solid insulating member, said fluid insulating medium comprising sulphur hexafluoride ($SF_6$) and at least said solid insulating member being a resinous cast body comprising (a) the resinous reaction products of an epoxide resin on the basis of a member of the group consisting of bisphenol-A-epichlorohydrin and diepoxides of cycloaliphatic esters with a hardening agent therefor, said resin having an epoxide equivalent weight of from about 175 to about 1500, and (b) a solid inorganic filler component consisting essentially of fused corundum in the form of slivery particles having a grain size within the range of from 1 to not greater than 50 microns.

2. The electrical device defined in claim 1, in which the concentration of filler particles in the surface layers of said cast body differs from the concentration of filler particles in the interior portions of said casting.

3. The electrical device defined in claim 2, in which the concentration of filler particles is greater in the surface layers of said cast body than in the interior portions of said casting.

4. The electrical device defined in claim 2, in which component (b) of said resinous cast body consists in a plurality of different particulate filler materials including (1) a filler material characterized by a relatively great inertness toward decomposition products of $SF_6$ and (2) a filler material characterized by a relatively great mechanical strength.

5. The electrical device defined in claim 4, in which filler material (1) consists essentially in calcium fluoride ($CaF_2$) and in which filler material (2) consists essentially in alumina ($Al_2O_3$).

6. The electrical device defined in claim 1, in which said hardening agent is selected from the group consisting of cycloaliphatic dicarboxylic acid anhydrides and amines.

References Cited

UNITED STATES PATENTS

| | | |
|---|---|---|
| 2,768,264 | 10/1956 | Jones. |
| 3,280,043 | 10/1966 | Larson. |
| 2,880,194 | 3/1959 | Glaser. |

FOREIGN PATENTS

| | | |
|---|---|---|
| 1,318,145 | 1/1963 | France. |
| 1,409,790 | 7/1965 | France. |

OTHER REFERENCES

Brady, G. S.: Materials Handybook, McGraw-Hill, New York, 1963, p. 234.

ELLIOT A. GOLDBERG, Primary Examiner

U.S. Cl. X.R.

200—148